United States Patent
Kageyama et al.

(10) Patent No.: US 9,755,442 B2
(45) Date of Patent: Sep. 5, 2017

(54) BATTERY PROTECTION INTEGRATED CIRCUIT AND CIRCUIT CHARACTERISTIC SETTING METHOD

(71) Applicants: Ryota Kageyama, Tokyo (JP); Tsutomu Yamauchi, Tokyo (JP); Nobuhito Tanaka, Tokyo (JP); Takashi Takeda, Tokyo (JP); Yoshihiro Satake, Tokyo (JP); Takeshi Yamaguchi, Tokyo (JP); Koji Koshimizu, Tokyo (JP); Norihito Kawaguchi, Tokyo (JP)

(72) Inventors: Ryota Kageyama, Tokyo (JP); Tsutomu Yamauchi, Tokyo (JP); Nobuhito Tanaka, Tokyo (JP); Takashi Takeda, Tokyo (JP); Yoshihiro Satake, Tokyo (JP); Takeshi Yamaguchi, Tokyo (JP); Koji Koshimizu, Tokyo (JP); Norihito Kawaguchi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/953,544

(22) Filed: Nov. 30, 2015

(65) Prior Publication Data
US 2016/0372945 A1 Dec. 22, 2016

(30) Foreign Application Priority Data
Jun. 17, 2015 (JP) .................. 2015-122355

(51) Int. Cl.
*H02J 7/00* (2006.01)
*H02J 7/14* (2006.01)

(52) U.S. Cl.
CPC .......... *H02J 7/0029* (2013.01); *H02J 7/0073* (2013.01); *H02J 7/0016* (2013.01); *H02J 7/0021* (2013.01);
(Continued)

(58) Field of Classification Search
USPC ........ 320/118, 132, 134, 136, 162; 324/427, 324/433; 307/18
See application file for complete search history.

(56) References Cited

U.S. PATENT DOCUMENTS

2005/0134230 A1* 6/2005 Sato .................. H01M 10/4264
320/136
2005/0190597 A1 9/2005 Kato
(Continued)

FOREIGN PATENT DOCUMENTS

JP 2000-276461 10/2000
JP 2005-303990 10/2005
(Continued)

OTHER PUBLICATIONS

Japanese Office Action mailed Sep. 8, 2015.

*Primary Examiner* — Alexis Pacheco
(74) *Attorney, Agent, or Firm* — IPUSA, PLLC

(57) ABSTRACT

A battery protection IC has detection circuits to detect faults of an overcharge, an over-discharge, and an overcurrent of a secondary battery; a control circuit to protect the secondary battery, by controlling (dis)charging the secondary battery upon the fault; and a delay circuit to generate delay after the fault before the controlling. The IC includes a memory unit to store data for setting and adjusting a circuit characteristic of the IC; and a setting circuit to set and adjust the circuit characteristic, based on the data from the memory unit. The memory unit includes a pair of non-volatile memory cells to complementarily store one bit, and a latch circuit directly cross-coupled with the memory cells, for each bit of the data. The latch circuit statically outputs the data from the memory cells to the setting circuit when the IC is turned on.

11 Claims, 12 Drawing Sheets

(52) U.S. Cl.
CPC ........... *H02J 7/0026* (2013.01); *H02J 7/0031* (2013.01); *H02J 2007/0037* (2013.01)

(56) References Cited

U.S. PATENT DOCUMENTS

| | | | |
|---|---|---|---|
| 2011/0267726 A1 | 11/2011 | Ikeuchi et al. | |
| 2012/0175953 A1* | 7/2012 | Ohkawa ................ | B60L 3/0046 307/18 |
| 2014/0306662 A1* | 10/2014 | Kim ..................... | H02J 7/0016 320/118 |
| 2016/0118821 A1* | 4/2016 | Takeda ................. | H02J 7/0031 320/134 |
| 2016/0190835 A1* | 6/2016 | Kageyama ............ | H02J 7/0029 320/136 |

FOREIGN PATENT DOCUMENTS

| | | |
|---|---|---|
| JP | 2010-187532 | 8/2010 |
| JP | 2011-239652 | 11/2011 |
| WO | 2011/037257 | 3/2011 |

\* cited by examiner

BATTERY PROTECTION INTEGRATED CIRCUIT AND CIRCUIT CHARACTERISTIC SETTING METHOD

CROSS-REFERENCE TO RELATED APPLICATIONS

This patent application is based upon and claims the benefit of priority of Japanese Patent Application No. 2015-122355, filed on Jun. 17, 2015, the entire contents of which are hereby incorporated by reference.

BACKGROUND OF THE INVENTION

1. Field of the Invention

The disclosures herein generally relate to a battery protection integrated circuit and a circuit characteristic setting method.

2. Description of the Related Art

Conventionally, a battery protection IC (Integrated Circuit) has been known that protects a secondary battery (see, for example, Patent Document 1).

RELATED-ART DOCUMENTS

Patent Documents

[Patent Document 1] Japanese Laid-open Patent Publication No. 2011-239652

It is necessary to customize a circuit characteristic of a battery protection IC that protects a secondary battery, depending on a type of the secondary battery, or a type of a product that has the battery protection IC built in. To cope with multiple different circuit characteristics, one may develop a battery protection IC that has multiple configurations to fit types of secondary batteries or products. In this case, however, the lead time and cost of the development tend to increase.

Therefore, to cope with multiple different circuit characteristics by a common circuit configuration, a configuration may be considered that includes a memory into which characteristic setting data for setting circuit characteristics of the battery protection IC is written, and a circuit characteristic is set based on the data read out of the memory. By this configuration, circuit characteristics can be changed on the common circuit configuration, by changing the contents of data stored in the memory. For example, if the memory stores data with which an overcharge detection voltage (a threshold voltage for detecting an overcharge) as one of circuit characteristics can be set, then, by changing the data, a setting voltage value of the overcharge detection voltage can be changed in the common circuit configuration.

On the other hand, as illustrated in FIG. 1, when data stored in a memory cell 160 is output to a battery protection control circuit 198, a data latch circuit 161 may be used for latching the data. The battery protection control circuit 198 is a circuit to control a protection operation of a secondary battery, following a battery protection specification that is determined by the data read out of the memory cell 160. If using such a data latch circuit 161, a clock generation circuit 162 is required to generate a latch control clock to control the state of the data latch circuit 161, and hence, circuit operations of a read circuit to read the data becomes complex. Also, adding the clock generation circuit 162 increases the consumed current and the chip size.

FIG. 2 is a diagram that illustrates a specific example of a configuration to output data to a battery protection control circuit by using a conventional read circuit. According to the conventional method, data stored in a memory cell is read out by using a clock 1 that controls a current flowing in the memory cell, and a clock 2 that controls a latch circuit. This method needs to generate the clocks 1 and 2 to read data, and a current flows momentarily on a data read.

FIG. 3 is a diagram that illustrates an example of operational timing of the read circuit in FIG. 2. A data read is executed when the power supply is turned on, and also executed as data refresh at regular intervals after the power-on.

SUMMARY OF THE INVENTION

Thereupon, it is a general object of at least one of the embodiments of the present invention to prevent the consumed current and the chip size from increasing.

According to an embodiment of the present invention, a battery protection IC has an overcharge detection circuit configured to detect an overcharge of a secondary battery; an over-discharge detection circuit configured to detect an over-discharge of the secondary battery; an overcurrent detection circuit configured to detect an overcurrent of the secondary battery; a control circuit configured to protect the secondary battery, by controlling charging and discharging the secondary battery when at least one fault is detected among the overcharge, the over-discharge and the overcurrent; and a delay circuit configured to generate a delay time to be passed before controlling charging and discharging the secondary battery after the fault has been detected. The battery protection IC includes a memory unit configured to store both data of characteristic setting data for setting a circuit characteristic of the battery protection IC, and characteristic adjustment data for adjusting an individual difference of the circuit characteristic of the battery protection IC; and a setting circuit configured to set the circuit characteristic, and to adjust the individual difference, based on both of said data output from the memory unit. The memory unit includes a set of a pair of non-volatile memory cells to complementarily store one bit; and a latch circuit having direct cross-coupled connections with outputs of the pair of memory cells, provided for each bit of both of said data. The latch circuit statically outputs the data stored in the memory cells provided for both of said data to the setting circuit when a power source of the battery protection IC rises.

According to another embodiment of the present invention, a circuit characteristic setting method is executed in a battery protection IC configured to protect a secondary battery, by controlling charging and discharging the secondary battery, after a delay time has passed since at least one fault has been detected among an overcharge of a secondary battery, an over-discharge of the secondary battery, and an overcurrent of the secondary battery. The method includes having a memory unit output at least one of data among characteristic setting data for setting a circuit characteristic of the battery protection IC, and characteristic adjustment data for adjusting an individual difference of the circuit characteristic of the battery protection IC, to have a setting circuit set the circuit characteristic, or adjust the individual difference. The memory unit includes a set of a pair of non-volatile memory cells to complementarily store one bit; and a latch circuit having direct cross-coupled connections with outputs of the pair of memory cells, provided for each bit of said one of data, and statically outputting the data stored in the memory cells provided for said one of data to the setting circuit when a power source of the battery protection IC rises.

According to at least one embodiment of the present invention, it is possible to prevent the consumed current and the chip size from increasing.

DETAILED DESCRIPTION OF THE PREFERRED EMBODIMENTS

In the following, embodiments of the present invention will be described with reference to the drawings.

Figure 1:
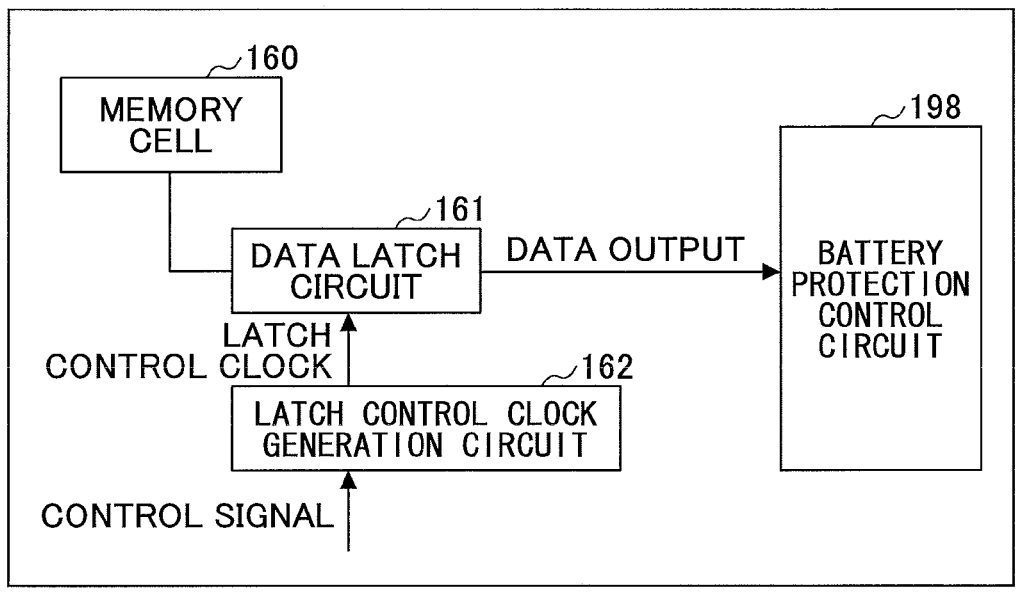
FIG. 1 is a diagram that illustrates an example of a configuration to output data to a battery protection control circuit by using a conventional read circuit.
Figure 2:
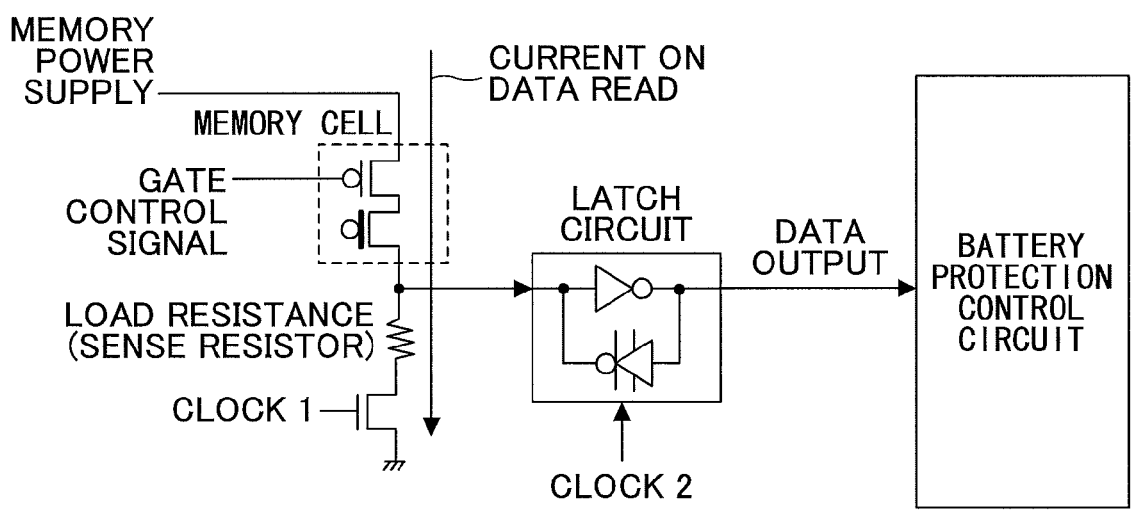
FIG. 2 is a diagram that illustrates a specific example of a configuration to output data to a battery protection control circuit by using a conventional read circuit.
Figure 3:
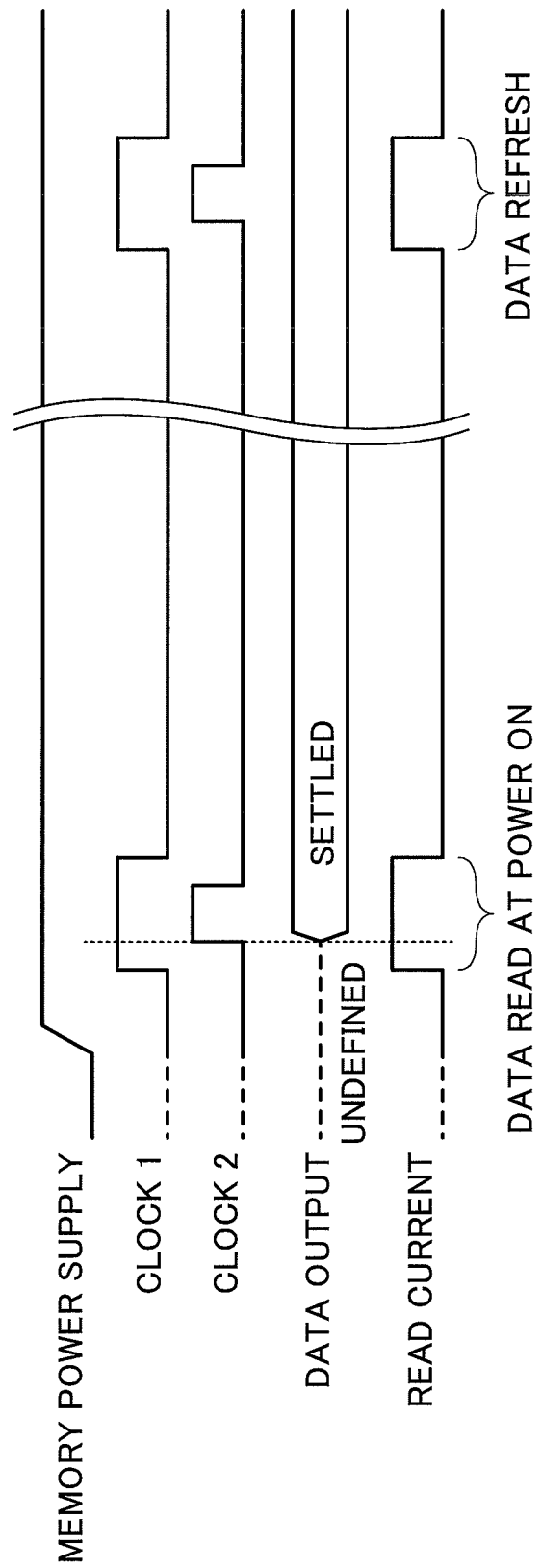
FIG. 3 is a diagram that illustrates an example of operational timing of a read circuit in FIG. 2.
Figure 4:
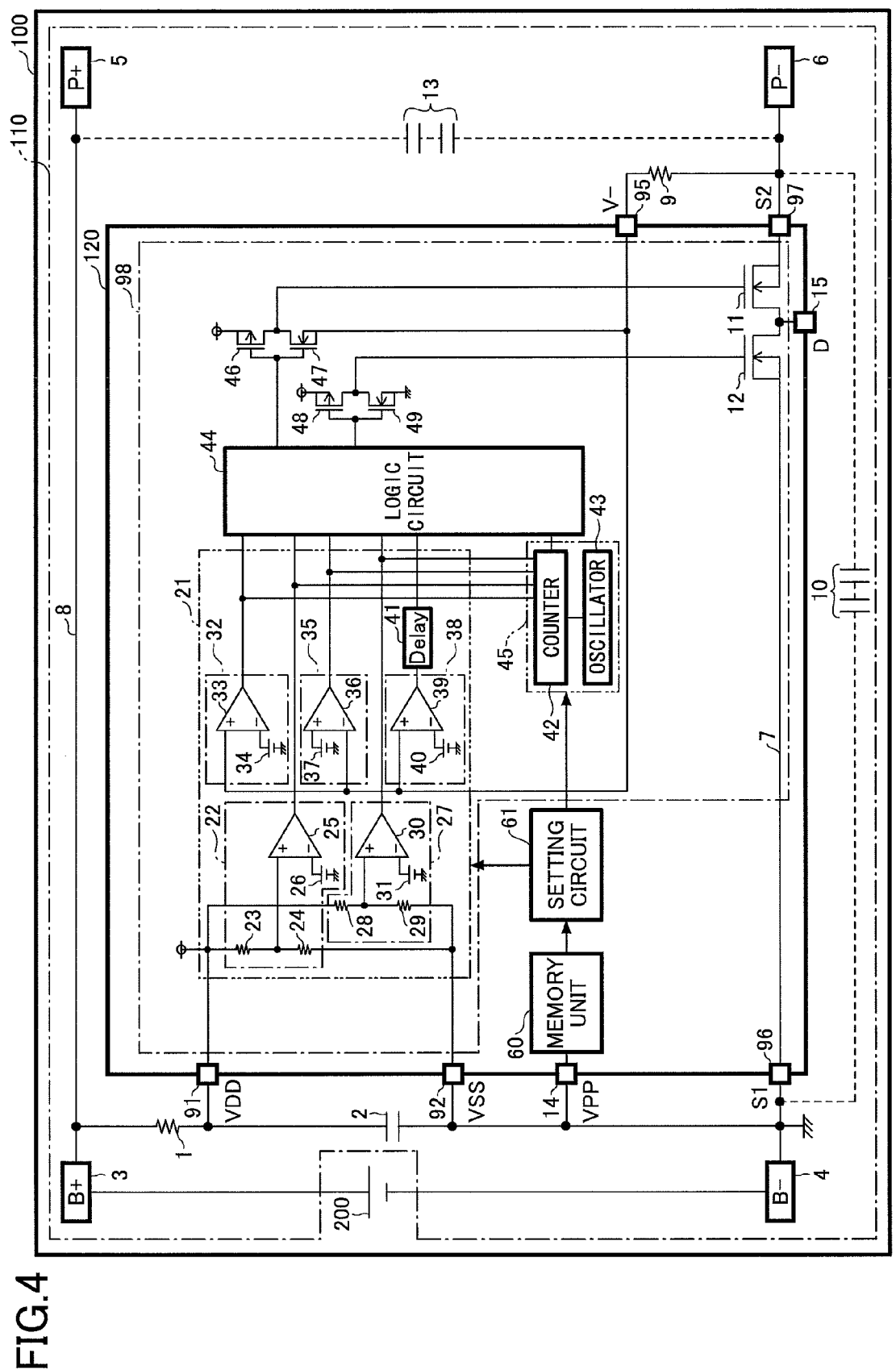
FIG. 4 is a configuration diagram that illustrates an example of a battery pack including a battery protection IC.

FIG. 4 is a configuration diagram that illustrates an example of a battery pack 100 including a battery protection IC 120. The battery pack 100 includes a secondary battery 200 that can supply power to an external load (not illustrated) connected via load connection terminals 5-6, and a battery protection device 110 that protects the secondary battery 200. The battery pack 100 may be built in or externally attached to the external load. A specific example of an external load may be a mobile terminal device that can be carried around. Specific examples of a mobile terminal device may be a cellular phone, a smart phone, a tablet-type computer, a game machine, and other electronic devices such as a TV, a music or video player, and a camera.

The secondary battery 200 can be charged by a charger (not illustrated) that is connected with the load connection terminals 5-6. As a specific example of the secondary battery 200, a lithium ion battery or a lithium polymer battery may be considered.

The battery protection device 110 is an example of a battery protection device that includes the load connection terminal 5, the load connection terminal 6, and cell connection terminals 3-4, and protects the secondary battery 200 connected with the cell connection terminals 3-4, from an overcurrent and the like. The cell connection terminal 3 is connected with the load connection terminal 5 via a power source path 8. The cell connection terminal 4 is connected with the load connection terminal 6 via a power source path 7. The cell connection terminal 3 is connected with the positive electrode of the secondary battery 200. The cell connection terminal 4 is connected with the negative electrode of the secondary battery 200.

The battery protection device 110 includes transistors 11-12. The transistor 11 is an example of a charge path cutoff part that can cut off a charge path of the secondary battery 200, and the transistor 12 is an example of a discharge path cutoff part that can cut off a discharge path of the secondary battery 200. In the illustrated case, the transistor 11 can cut off the power source path 7 through which a charge current of the secondary battery 200 flows, and the transistor 12 can cut off the power source path 7 through which a discharge current of the secondary battery 200 flows. The transistors 11-12 are switching elements that can switch the power source path 7 between a conductive state and a cut-off state, and are inserted in series on the power source path 7.

The transistors 11-12 are, for example, MOSFETs (Metal Oxide Semiconductor Field Effect Transistors). The transistor 11 is inserted on the power source path 7 by matching the forward bias direction of a parasitic diode of the transistor 11 with the discharge direction of the secondary battery 200. The transistor 12 is inserted on the power source path 7 by matching the forward bias direction of a parasitic diode of the transistor 12 with the charge direction of the secondary battery 200.

The battery protection device 110 may include capacitors 10 and 13. The capacitor 10 is connected in parallel with a series circuit of the transistor 11 and the transistor 12. The capacitor 13 has a terminal that is connected with the load connection terminal 5, and the other terminal that is connected with the load connection terminal 6. Having the capacitor 10 or the capacitor 13, tolerance can be improved for voltage fluctuation and external noise.

The battery protection device 110 includes the battery protection IC 120. The battery protection IC 120 is an example of a battery protection IC that operates on the secondary battery 200 as the power source, and protects the secondary battery 200 from an overcurrent and the like, by controlling charging and discharging the secondary battery 200. The battery protection IC 120 receives power supplied from the secondary battery 200, and protects the secondary battery 200.

The battery protection IC 120 includes, for example, a power terminal 91, a ground terminal 92, a current detection terminal 95, a first source terminal 96, a second source terminal 97, a drain terminal 15, and a memory power supply terminal 14.

The power terminal 91 is a power terminal on the positive electrode side that is connected with the cell connection terminal 3 or the power source path 8 via a resistor 1, and may be referred to as the "VDD terminal". The power terminal 91 is connected with, for example, a connection point between a terminal of the resistor 1 having the other terminal connected with the power source path 8, and a terminal of capacitor 2 having the other terminal connected with the power source path 7. The other terminal of the capacitor 2 is connected with the power source path 7 between the cell connection terminal 4 and the transistor 12.

The ground terminal 92 is a power terminal on the negative electrode side that is connected with the power source path 7 between the cell connection terminal 4 and the transistor 12, and may be referred to as the "VSS terminal".

The current detection terminal 95 is a terminal through which a detection voltage is input depending on a current flowing in the secondary battery 200, and may be referred to as the "V− terminal". The current detection terminal 95 is connected with the power source path 7 between the load connection terminal 6 and the transistor 11 via a resistor 9.

The first source terminal 96 is a terminal that is connected with the source of the transistor 12 for discharge control in the battery protection IC 120, and may be referred to as the "S1 terminal".

The second source terminal 97 is a terminal that is connected with the source of the transistor 11 for charge control in the battery protection IC 120, and may be referred to as the "S2 terminal".

The drain terminal 15 is a terminal that is drawn out of a connection point between the drain of the transistor 11 and the drain of the transistor 12, and may be referred to as the "D terminal". The drain terminal 15 is a terminal for testing the battery protection IC 120.

The memory power supply terminal 14 is a power source input terminal of a memory unit 60, and may be referred to as the "VPP terminal". The memory power supply terminal 14 is a terminal to input a voltage to transition to a mode to write data in the memory unit 60, or a mode to read data out of the memory unit 60, in a screening test process to determine the specification of the battery protection IC 120. The screening test process is a process in the manufacturing process that is applied before or after the battery protection IC 120 is mounted on a circuit board of the battery protection device 110. After having the screening test process applied, the memory power supply terminal 14 is connected at the same potential as the VSS terminal and the S1 terminal as illustrated in FIG. 4, to prevent an erroneous write into the memory unit 60.

The battery protection IC 120 includes, for example, the memory unit 60, a setting circuit 61, and a battery protection control circuit 98. The memory unit 60 is an example of a non-volatile memory that can have data written, for example, by a write voltage input at the memory power supply terminal 14. As a specific example of the memory unit 60, an OTPROM (One Time Programmable ROM) or an EEPROM (Electrically Erasable Programmable ROM) may be considered.

As data to be written in the memory unit 60, for example, characteristic setting data may be considered that is to set a circuit characteristic of the battery protection IC 120. The setting circuit 61 sets, for example, a battery protection characteristic that corresponds to the contents of characteristic setting data read out of the memory unit 60, as a circuit characteristic of the battery protection IC 120. The battery protection control circuit 98 is a protection operation circuit that controls protection operations of the secondary battery 200, for example, following a battery protection specification that is set by the characteristic setting data read out by the setting circuit 61 from the memory unit 60.

Therefore, if the characteristic setting data written in the memory unit 60 is changed, protection operations of the secondary battery 200 can be changed. Therefore, a common circuit configuration can be used to cope with multiple different circuit characteristics. For example, even the type of the secondary battery 200 and the type of a product in which the battery protection IC 120 is built are changed, the hardware of the battery protection IC 120 can be commonized.

Also, since the battery protection IC 120 includes the memory unit 60 that can have characteristic setting data written, it does not require, for example, a metal wiring change of the IC chip, or laser trimming of fuses, to customize circuit characteristics. Consequently, the lead time and cost can be reduced for development and manufacturing.

Figure 16:
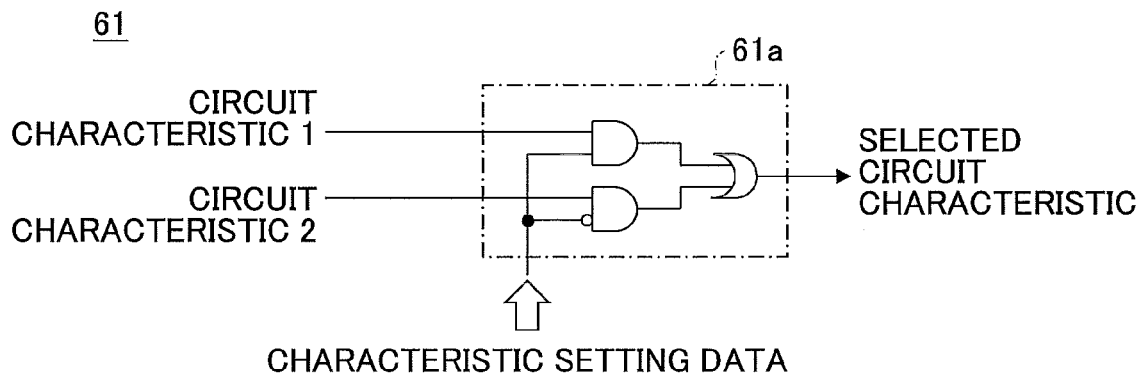
FIG. 16 is a diagram that illustrates an example of a selector circuit that selects a circuit characteristic of a battery protection IC.

FIG. 16 is a diagram that illustrates an example of a selector circuit 61a having a selector circuit 61a that selects a circuit characteristic of the battery protection IC 120. The selector circuit 61a selects a circuit characteristic among candidates of multiple circuit characteristic (in the case of FIG. 16, circuit characteristics 1 and 2) that corresponds to the contents of characteristic setting data read out of the memory unit 60. The setting circuit 61 sets the circuit characteristic selected by the selector circuit 61a as a circuit characteristic of the battery protection IC 120.

In FIG. 4, as characteristic setting data written in the memory unit 60, for example, data may be considered that is to set a detection characteristic of a fault detection circuit 21, which will be described later.

As characteristic setting data to set a detection characteristic of the fault detection circuit 21, for example, the threshold voltage setting data may be considered that is to set an overcurrent detection voltage (a threshold voltage for overcurrent detection) such as a discharging overcurrent detection voltage Vdet3, which will be described later. For example, the setting circuit 61 can set a typical value (a representative value) of the overcurrent detection voltage, following the threshold voltage setting data for setting the overcurrent detection voltage read out of the memory unit 60. Therefore, by changing contents of the threshold voltage setting data written in the memory unit 60, the typical value of the threshold voltage such as an overcurrent detection voltage can be changed in a common circuit configuration.

Also, as characteristic setting data to set a detection characteristic of the fault detection circuit 21, for example, delay time setting data may be considered that is to set a delay time such as a discharging overcurrent detection delay time tVdet3, which will be described later. For example, the setting circuit 61 can set a typical value (a representative value) of the delay time, following the delay time setting data read out of the memory unit 60. Therefore, by changing contents of delay time setting data written in the memory unit 60, the typical value of the delay time can be changed in a common circuit configuration.

Also, as data to be written in the memory unit 60, for example, characteristic adjustment data may be considered that is to adjust individual differences of the battery protection ICs 120 with respect to a circuit characteristic of the battery protection ICs 120. The setting circuit 61 finely adjusts the circuit characteristic of the battery protection IC 120, for example, following contents of the characteristic adjustment data read out of the memory unit 60. Thus, dispersion of individual differences among the battery protection ICs 120 can be suppressed in terms of the circuit characteristics of the battery protection ICs 120.

As characteristic adjustment data to be written in the memory unit 60, for example, data may be considered that is to absorb individual differences of detection characteristics of the fault detection circuits 21, which will be described later.

As characteristic adjustment data to absorb individual differences of detection characteristics of the fault detection circuits 21, for example, threshold voltage adjustment data may be considered that is to adjust individual differences of overcurrent detection voltages such as discharging overcurrent detection voltage Vdet3, which will be described later. For example, the setting circuit 61 can finely adjust a typical value of the overcurrent detection voltage set by the characteristic setting data read out of the memory unit 60, following the threshold voltage adjustment data for adjusting the overcurrent detection voltage read out of the memory unit 60.

Also, as characteristic adjustment data to adjust individual differences of detection characteristics of the fault detection circuits 21, for example, delay time adjustment data may be considered that is to adjust individual differences of the delay time such as discharging overcurrent detection delay time tVdet3, which will be described later. For example, the setting circuit 61 can finely adjust a typical value of the delay time set by the characteristic setting data read out of the memory unit 60, following the delay time adjustment data read out of the memory unit 60.

The battery protection control circuit 98 includes the fault detection circuit 21 to detect a fault of a current or a voltage of the secondary battery 200, and a logic circuit 44 to control turning on and off the transistors 11-12, based on a fault detection result by the fault detection circuit 21. The fault detection circuit 21 includes, for example, an overcharge detection circuit 22, an over-discharge detection circuit 27, a discharging overcurrent detection circuit 32, a charging overcurrent detection circuit 35, a short-circuit detection circuit 38.

The logic circuit 44 is an example of a control circuit that protects the secondary battery 200 by controlling charging and discharging the secondary battery 200, if at least one fault is detected among an overcharge, an over-discharge, a discharging overcurrent, a charging overcurrent, and a short-circuit.

The battery protection control circuit 98 executes, for example, an operation (an overcharge protection operation) to protect the secondary battery 200 from overcharging. For example, the overcharge detection circuit 22 monitors the battery voltage (a cell voltage) of the secondary battery 200, by detecting the voltage between the power terminal 91 and the ground terminal 92 by the resistors 23-24. By detecting a cell voltage greater than or equal to the overcharge detection voltage Vdet1 set depending on the threshold voltage setting data read out of the memory unit 60, the overcharge detection circuit 22 determines it as detection of an overcharge of the secondary battery 200, and outputs an overcharge detection signal. Detecting the cell voltage greater than or equal to the overcharge detection voltage Vdet1, and outputting the overcharge detection signal are executed by a comparator 25 with reference to a reference voltage 26.

Having detected an overcharge detection signal, the logic circuit 44 waits until an overcharge detection delay time tVdet1 passes, which is set depending on the delay time setting data read out of the memory unit 60, and executes an overcharge protection operation that is to output a low-level control signal to turn off the transistor 11 to the gate of the transistor 11. By having the transistor 11 turned off, it is possible to prevent the secondary battery 200 from being overcharged, irrespective of an on state and an off state of the transistor 12. The logic circuit 44 turns off the transistor 46, and turns on the transistor 47, to turn off the transistor 11.

The battery protection control circuit 98 executes, for example, an operation (an over-discharge protection operation) to protect the secondary battery 200 from over-discharging. For example, the over-discharge detection circuit 27 monitors the battery voltage (a cell voltage) of the secondary battery 200 by detecting the voltage between the power terminal 91 and the ground terminal 92 by resistors 28-29. By detecting a cell voltage less than or equal to the over-discharge detection voltage Vdet2 set depending on the threshold voltage setting data read out of the memory unit 60, the overcharge detection circuit 22 determines it as detection of an over-discharge of the secondary battery 200, and outputs an over-discharge detection signal. Detecting the cell voltage less than or equal to the over-discharge detection voltage Vdet2, and outputting the over-discharge detection signal are executed by a comparator 30 with reference to a reference voltage 31.

Having detected an over-discharge detection signal, the logic circuit 44 waits until an over-discharge detection delay time tVdet2 passes, which is set depending on the delay time setting data read out of the memory unit 60, and executes an over-discharge protection operation that is to output a low-level control signal to turn off the transistor 12, to the gate of the transistor 12. By having the transistor 12 turned off, it is possible to prevent the secondary battery 200 from being over-discharged, irrespective of an on state and an off state of the transistor 11. The logic circuit 44 turns off the transistor 48, and turns on the transistor 49, to turn off the transistor 12.

The battery protection control circuit 98 executes, for example, an operation (a discharging overcurrent protection operation) to protect the secondary battery 200 from a discharging overcurrent. For example, the discharging overcurrent detection circuit 32 monitors a voltage P− between the load connection terminal 6 and the cell connection terminal 4, by detecting the voltage between the current detection terminal 95 and the ground terminal 92. By detecting a voltage P− greater than or equal to the discharging overcurrent detection voltage Vdet3 set depending on the threshold voltage setting data readout of the memory unit 60, the discharging overcurrent detection circuit 32 determines it as detection of a discharging overcurrent that flows in the load connection terminal 6 as a faulty current, and outputs a discharging overcurrent detection signal. Detecting a voltage P− greater than or equal to the discharging overcurrent detection voltage Vdet3, and outputting the discharging overcurrent detection signal are executed by a comparator 33 with reference to a reference voltage 34.

Having detected a discharging overcurrent detection signal, the logic circuit 44 waits until a discharging overcurrent detection delay time tVdet3 passes, which is set depending on the delay time setting data read out of the memory unit 60, and executes a discharging overcurrent protection operation that is to output a low-level control signal to turn off the transistor 12, to the gate of the transistor 12. By having the transistor 12 turned off, it is possible to prevent an overcurrent from flowing in the direction to discharge the secondary battery 200, irrespective of an on state and an off state of the transistor 11.

Note that in an on state of the transistor 12, the voltage P− rises when a discharge current that discharges the secondary battery 200 flows because a voltage rise is generated by the on-resistance of the transistor 12.

The battery protection control circuit 98 executes, for example, an operation (a charging overcurrent protection operation) to protect the secondary battery 200 from a charging overcurrent. For example, the charging overcurrent detection circuit 35 monitors the voltage P− between the load connection terminal 6 and the cell connection terminal 4, by detecting the voltage between the current detection terminal 95 and the ground terminal 92. By detecting a voltage P− less than or equal to the charging overcurrent detection voltage Vdet4 set depending on the threshold voltage setting data read out of the memory unit 60, the charging overcurrent detection circuit 35 determines it as detection of a charging overcurrent that flows in the load connection terminal 6 as a faulty current, and outputs a charging overcurrent detection signal. Detecting a voltage P− less than or equal to the charging overcurrent detection voltage Vdet4, and outputting the charging overcurrent detection signal are executed by a comparator 36 with reference to a reference voltage 37.

Having detected a charging overcurrent detection signal, the logic circuit 44 waits until a charging overcurrent detection delay time tVdet4 passes, which is set depending on the delay time setting data read out of the memory unit 60, and executes a charging overcurrent protection operation that is to output a low-level control signal to turn off the transistor 11, to the gate of the transistor 11. By having the transistor 11 turned off, it is possible to prevent an overcurrent from flowing in the direction to charge the secondary battery 200, irrespective of an on state and an off state of the transistor 12.

Note that in an on state of the transistor 11, the voltage P− falls when a charge current that charges the secondary battery 200 flows because a voltage fall is generated by the on-resistance of the transistor 11.

The battery protection control circuit 98 executes, for example, an operation (a short-circuit protection operation) to protect the secondary battery 200 from a short-circuit overcurrent. For example, the short-circuit detection circuit 38 monitors the voltage P− between the load connection terminal 6 and the cell connection terminal 4, by detecting the voltage between the current detection terminal 95 and the ground terminal 92. By detecting a voltage P− greater than or equal to a short-circuit detection voltage Vshort set depending on the threshold voltage setting data read out of the memory unit 60, the short-circuit detection circuit 38 determines it as detection of a short-circuit, and outputs a short-circuit detection signal. Detecting a voltage P− greater than or equal to the short-circuit detection voltage Vshort, and outputting the short-circuit detection signal are executed by a comparator 39 with reference to a reference voltage 40.

The short-circuit detection signal is input into a delay circuit 41, and then, is output from the delay circuit 41 when a short-circuit detection delay time tshort passes. The short-circuit detection delay time tshort is a time that is set depending on the delay time setting data read out of the memory unit 60.

Having detected a short-circuit detection signal via the delay circuit 41, the logic circuit 44 executes a short-circuit protection operation that is to output a low-level control signal to turn off the transistor 12, to the gate of the transistor 12. By having the transistor 12 turned off, it is possible to prevent a short-circuit current from flowing in the direction to discharge the secondary battery 200, irrespective of an on state and an off state of the transistor 11.

The threshold voltage setting data has been written in the memory unit 60 in advance that is used for setting threshold voltages including the overcharge detection voltage Vdet1, the over-discharge detection voltage Vdet2, the discharging overcurrent detection voltage Vdet3, the charging overcurrent detection voltage Vdet4, and the short-circuit detection voltage Vshort.

For example, based on the threshold voltage setting data of the overcharge detection voltage Vdet1 that is read and output from the memory unit 60, the setting circuit 61 changes at least one of resistance values of the resistor 23 and resistor 24. Thus, the setting circuit 61 can set the overcharge detection voltage Vdet1 to a voltage value as specified in the threshold voltage setting data. Also, based on the threshold voltage setting data of the overcharge detection voltage Vdet1 that is read and output from the memory unit 60, the setting circuit 61 finely adjusts at least one of the resistance values of the resistor 23 and resistor 24. Thus, the setting circuit 61 can finely adjust the overcharge detection voltage Vdet1 that has been set as specified in threshold voltage adjustment data, to the value specified in the threshold voltage setting data. These steps are the same for setting the over-discharge detection voltage Vdet2.

For example, based on the threshold voltage setting data of the discharging overcurrent detection voltage Vdet3 that is read out of the memory unit 60, the setting circuit 61 changes the voltage value of the reference voltage 34. Thus, the setting circuit 61 can set the discharging overcurrent detection voltage Vdet3 to a voltage value as specified in the threshold voltage setting data. Also, based on the threshold voltage setting data of the discharging overcurrent detection voltage Vdet3 that is read out of the memory unit 60, the setting circuit 61 finely adjusts the voltage value of the reference voltage 34. Thus, the setting circuit 61 can finely adjust the discharging overcurrent detection voltage Vdet3 that has been set as specified in threshold voltage adjustment data, to the value specified in the threshold voltage setting data. These steps are the same for setting the charging overcurrent detection voltage Vdet4, the short-circuit detection voltage Vshort, and the like.

The delay time setting data has been written in the memory unit 60 in advance that is used for setting delay times including the overcharge detection delay time tVdet1, the over-discharge detection delay time tVdet2, the discharging overcurrent detection delay time tVdet3, the charging overcurrent detection delay time tVdet4, and the short-circuit detection delay time tshort.

Figure 17:
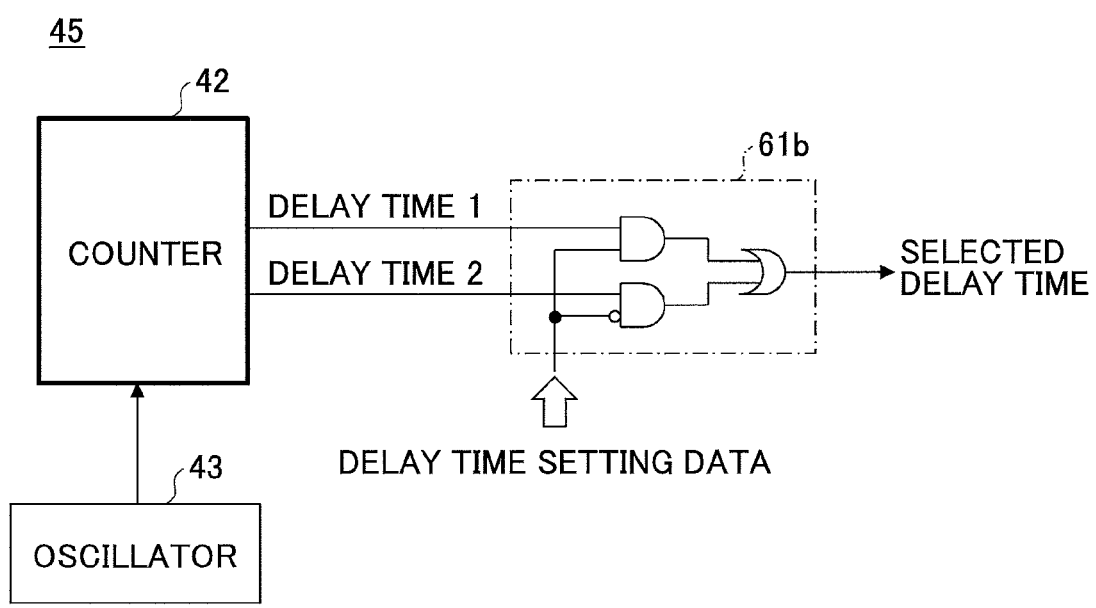
FIG. 17 is a diagram that illustrates an example of a delay circuit that generates a delay time.

For example, as illustrated in FIG. 17, the setting circuit 61 includes a selector circuit 61b to select a delay time that is generated by a counter 42 of a delay circuit 45, based on the delay time setting data of the overcharge detection delay time tVdet1 read and output from the memory unit 60. Thus, the setting circuit 61 can set the overcharge detection delay time tVdet1 to a value as specified in the delay time setting data. Therefore, the delay circuit 45 can generate the overcharge detection delay time tVdet1 that is selected by the selector circuit 61b of the setting circuit 61. Note that the overcharge detection delay time tVdet1 is a delay time that passes after an overcharge has been detected by the overcharge detection circuit 22 until the transistor 11 is turned off.

These steps are the same for setting delay times including the over-discharge detection delay time tVdet2, the discharging overcurrent detection delay time tVdet3, and the charging overcurrent detection delay time tVdet4.

The delay circuit 45 includes the counter 42 and an oscillator 43. The counter 42 includes a circuit, for example, having multiple flipflops connected in series, and can generate multiple different delay times. The counter 42 operates on a clock from the oscillator 43.

Figure 18:
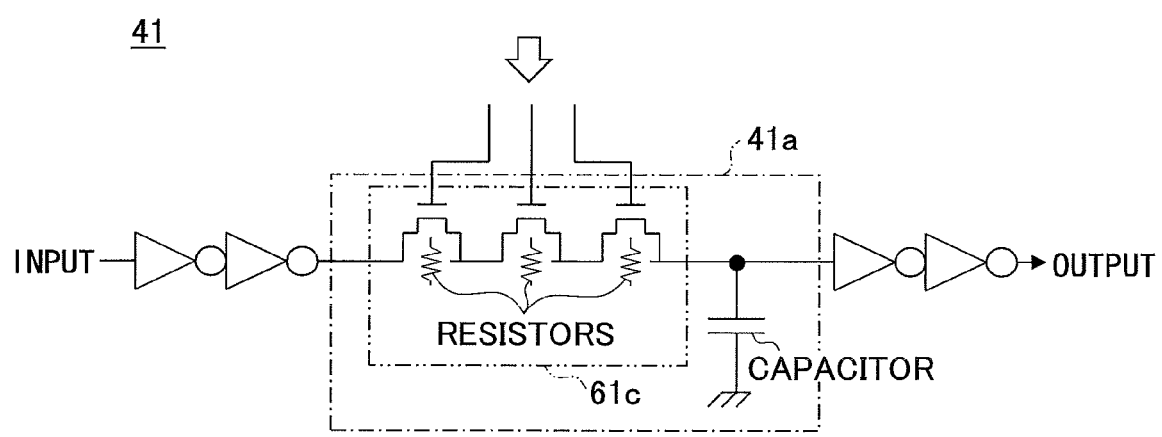
FIG. 18 is a diagram that illustrates an example of a delay circuit that generates a delay time.

For example, as illustrated in FIG. 18, the setting circuit 61 includes a change circuit 61c that changes the time constant of a first delay circuit 41a in the delay circuit 41, by adjusting the resistance value of the first delay circuit 41a, following the delay time setting data of the short-circuit detection delay time tshort read out of the memory unit 60. Thus, the setting circuit 61 can set the short-circuit detection delay time tshort to a value as specified in the delay time setting data. Therefore, the delay circuit 41 can generate the short-circuit detection delay time tshort that is set by the change circuit 61c of the setting circuit 61. Note that the short-circuit detection delay time tshort is a delay time that passes after a short-circuit has been detected by the short-circuit detection circuit 38 until the transistor 12 is turned off.

In this way, the battery protection IC 120 includes a partial current path of the power source path 7, the pair of the transistors 11-12, the battery protection control circuit 98, the memory unit 60, and the setting circuit 61. The battery protection IC 120 may have these elements, for example, contained in a package (for example, a resin sealed body).

Figure 5:
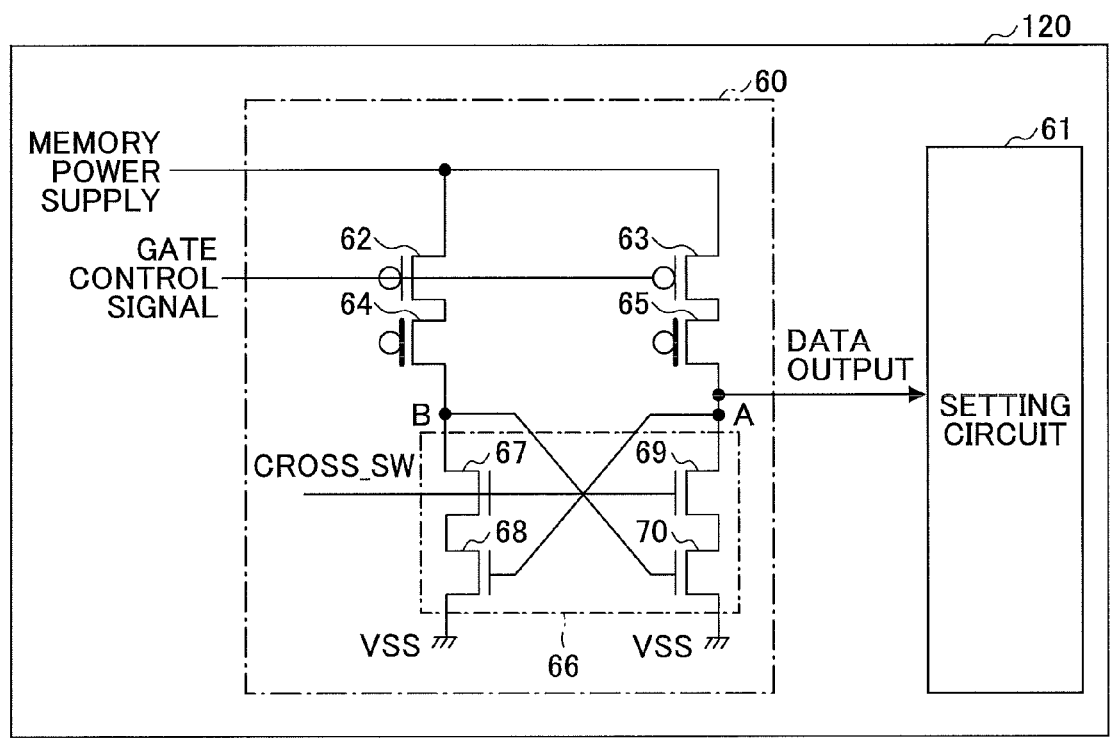
FIG. 5 is a diagram that illustrates a first example of a configuration of a memory unit.

FIG. 5 is a diagram that illustrates a first example of a configuration of the memory unit 60. The memory unit 60 stores at least one of characteristic setting data and characteristic adjustment data, with respect to the detection characteristics of at least one of detection circuits among the overcharge detection circuit 22, the over-discharge detection circuit 27, the discharging overcurrent detection circuit 32, the charging overcurrent detection circuit 35, and the short-circuit detection circuit 38. The detection characteristics of a detection circuit includes at least a detection voltage (a threshold voltage for detection) among the overcharge detection voltage Vdet1, the over-discharge detection voltage Vdet2, the discharging overcurrent detection voltage Vdet3, the charging overcurrent detection voltage Vdet4, and the short-circuit detection voltage Vshort.

The memory unit 60 includes a pair of memory cells 64-65 and a memory circuit 66. Note that the memory unit 60 illustrated in FIG. 5 is a circuit to store one bit of data such as the characteristic setting data, and multiple memory units 60 for the require number of bits are built in the battery protection IC 120. The memory units 60 include sets of pairs of memory cells 64-65 and memory circuits 66, for a number that is greater than or equal to the number of bits of at least one of the characteristic setting data and the characteristic adjustment data.

The pair of memory cells 64-65 are non-volatile memory elements to complementarily store one bit of data. Namely, the first memory cell 64 and the second memory cell 65 hold values inverted with each other, respectively. For example, if the first memory cell 64 holds "0", the second memory cell 65 holds "1".

The memory unit 60 may include a pair of selector transistors 62-63 to select a memory cell from which the data is output statically. The first selector transistor 62 is connected in series between the first memory cell 64 and a memory power supply, and the second selector transistor 63 is connected in series between the second memory cell 65 and the memory power supply. Both the pair of selector transistors 62-63 are P-channel MOSFETs (PMOS transistors).

When a gate control signal turns on (to an active level), the first selector transistor 62 turns on to permit data stored in the first memory cell 64 to be statically output to an output node B. On the other hand, when the gate control signal turns off (to a non-active level), the first selector transistor 62 turns off to inhibit the data stored in the first memory cell 64 from being output to the output node B.

When the gate control signal is on (at an active level), the second selector transistor 63 turns on to permit data stored in the second memory cell 65 to be statically output to an output node A. On the other hand, when the gate control signal is off (at a non-active level), the second selector transistor 63 turns off to inhibit the data stored in the second memory cell 65 from being output to the output node A.

In the case in FIG. 5, "the gate control signal is on" means that the level of the gate control signal takes a low level, and "the gate control signal is off" means that the level of the gate control signal takes a high level.

By providing such selector transistors, a memory cell can be selected to statically output data, following a gate control signal.

The gate control signal is a signal supplied from a circuit out of the memory unit 60. The gate control signal is turned on when data is to be written in the memory cell, and after the write, continuously fixed to be on to have the data statically output from the memory cell.

The memory circuit 66 is an example of a volatile memory circuit that has cross-coupled connections with the pair of memory cells 64-65 at the output nodes A and B. When the power supply voltage VDD (see FIG. 4) rises at the power terminal 91 of the battery protection IC 120, the memory circuit 66 statically outputs data (namely, to be read constantly) stored in the pair of memory cells 64-65 as data of at least one of the characteristic setting data and the characteristic adjustment data to the output nodes A and B. In the case in FIG. 5, for example, after the rise of the power supply voltage VDD of the battery protection IC 120, the memory circuit 66 statically outputs data stored in the second memory cell 65 among the pair of memory cells 64-65 to the setting circuit 61.

The voltage of the memory power supply supplied to the memory circuit 66 is a regulated voltage that rises with the rise of the power supply voltage VDD at the power terminal 91, and stepped down from the power supply voltage VDD, for example, by a regulator. The voltage of the memory power supply may be the same as the power supply voltage VDD.

In FIG. 5, an example is illustrated in which the memory circuit 66 is a cross-coupled latch circuit. A cross-coupled latch circuit is a circuit including, for example, a first MOS transistor of a first conductive type and a second MOS transistor of the first conductive type that are connected and cross-coupled with each other. The cross-coupled latch circuit in FIG. 5 is a circuit including a first NMOS transistor 68 and a second NMOS transistor 70 that are connected and cross-coupled with each other. An NMOS transistor means an N-channel MOSFET.

The first NMOS transistor 68 is connected in series between the first memory cell 64 and the ground (VSS), and the second NMOS transistor 70 is connected in series between the second memory cell 65 and the ground (VSS). The gate of the first NMOS transistor 68 is connected with the output node A between the drain of the second memory cell 65 and the drain of the second NMOS transistor 70. The gate of the second NMOS transistor 70 is connected with the output node B between the drain of the first memory cell 64 and the drain of the first NMOS transistor 68.

The memory unit 60 may include a first activation transistor 67 connected in series between the first memory cell 64 and the first NMOS transistor 68, and a second activation transistor 69 connected in series between the second memory cell 65 and the second NMOS transistor 70. The first activation transistor 67 and the second activation transistor 69 are, for example, NMOS transistors.

The first activation transistor 67 and the second activation transistor 69 turn on when the activation signal CROSS_SW is on (at an active level), to enable the latch function of the memory circuit 66. On the other hand, the first activation transistor 67 and the second activation transistor 69 turn off when the activation signal CROSS_SW is off (at a nonactive level), to disable the latch function of the memory circuit 66. In the case in FIG. 5, "the activation signal CROSS_SW is on" means that the level of the activation signal CROSS_SW takes a high level, and "the activation signal CROSS_SW is off" means that the level of the activation signal CROSS_SW takes a low level.

The activation signal CROSS_SW is a signal supplied from a circuit out of the memory unit 60. The activation signal CROSS_SW switches from off to on after a data write is completed in the pair of memory cells 64-65. Turning on the activation signal CROSS_SW enables the latch function of the memory circuit 66, and the memory circuit 66 holds (latches) data written into the pair of memory cells 64-65.

This cross-coupled configuration makes it possible to have the pair of memory cells 64-65 statically output data, once a data write is completed in the pair of memory cells 64-65, without using a control signal for reading data from the pair of memory cells 64-65.

Figure 6:
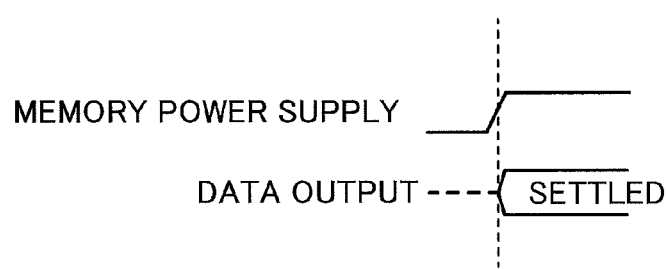
FIG. 6 is a diagram that illustrates an example of settlement timing of an output data level.

In this way, the memory unit 60 is configured to include the pair of non-volatile memory cells 64-65 to complementarily store data, and the volatile memory circuit 66 having cross-coupled connections with the output of the pair of memory cells 64-65. Configured in this way, by having values inverted each other written into the pair of memory cells 64-65, the data stored in the pair of memory cells 64-65 is immediately latched by the memory circuit 66 when the memory power supply rises. Therefore, as illustrated in FIG. 6, at virtually the same time as the rise of the memory power supply, data output from the pair of memory cells 64-65 can be promptly settled to either the high-level or the low-level. Then, the data latched by the memory circuit 66 is output constantly, and the data can be read constantly.

Figure 7:
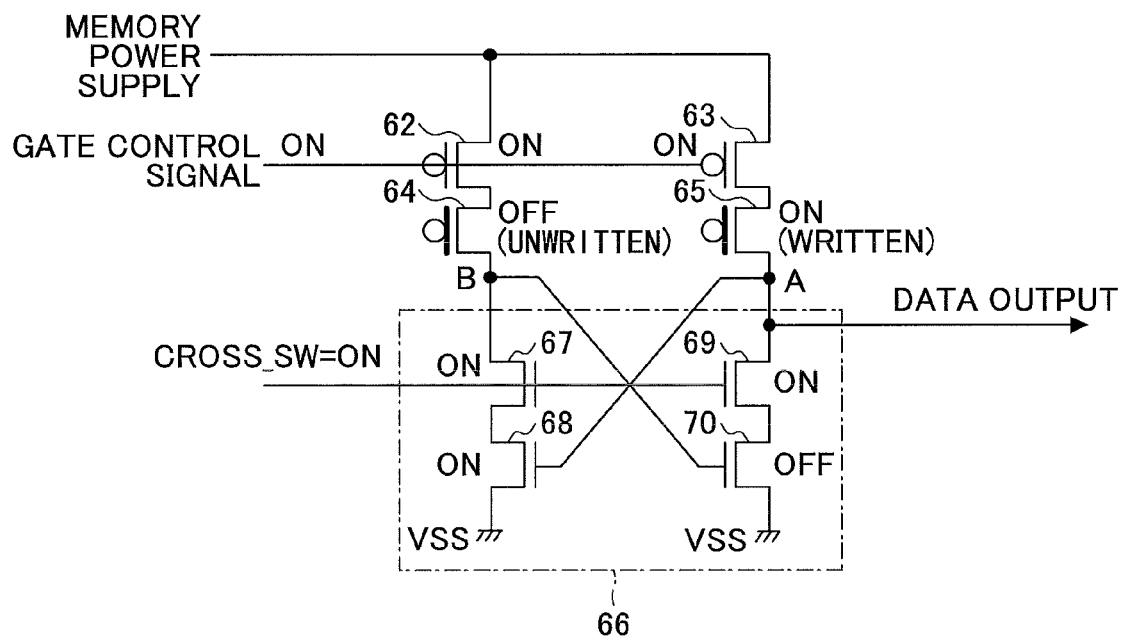
FIG. 7 is a diagram that illustrates an example of operations of a memory unit.

FIG. 7 is a diagram that illustrates an example of operations of the memory unit 60. An example of a circuit operation will be described in which the first memory cell 64 is in an off state (data unwritten state), and the second memory cell 65 is in an on state (data written state).

Since the second memory cell 65 is on, data at the same level as the memory power supply is output to the output node A. Also, the first NMOS transistor 68 receiving the potential of the output node A as input at the gate, is turned on. Having the first NMOS transistor 68 turned on, and the first memory cell 64 turned off, the output node B goes to the low-level (the ground level or 0 V). The second NMOS transistor 70 receiving the potential of the output node B as input at the gate, is turned off.

Namely, even immediately after the rise of the memory power supply, it is possible to prevent a through-current from flowing in the memory unit 60 because the first memory cell 64 is off although the first NMOS transistor 68 is on, and the second NMOS transistor 70 is off although the second memory cell 65 is on.

Also, by this configuration, a static operation to have data constantly output from a memory cell can be implemented. Also, on a rise of the power source, data of the memory cell, and output data of the memory unit 60 can be read out stably.

Also, since this circuit implements a static latch by the transistors connected in series with the memory cells, a conventional latch circuit or a control signal for read are not required, and stable memory data can be used in the setting circuit 61 as is immediately after the rise of the power source. Therefore, a current conventionally generated every time data is read out, can be eliminated. Also, it is not necessary to add a clock circuit and the like to control reading constantly, and hence, usability is improved, and reduction of the consumed current and the chip size can be realized.

Figure 8:
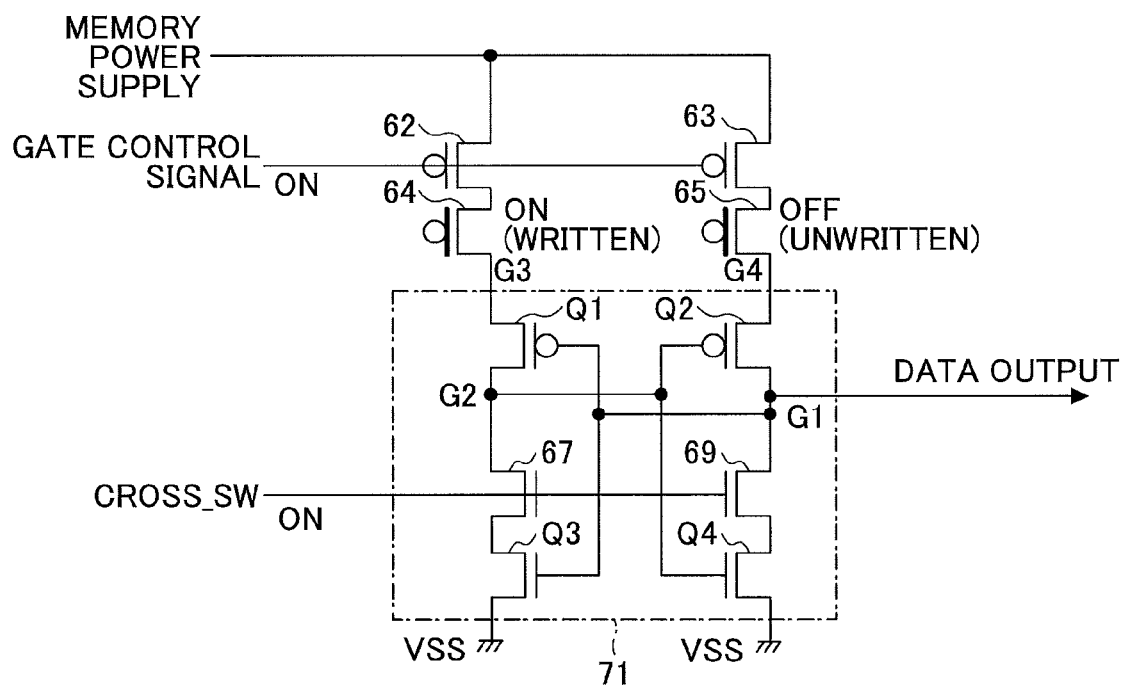
FIG. 8 is a diagram that illustrates a second example of a configuration of a memory unit.

FIG. 8 is a diagram that illustrates a second example of a configuration of the memory unit 60. For the same elements as in the first example, description in the first example above will be referred to. A memory circuit 71 in FIG. 8 is a circuit that is configured to include a pair of PMOS transistors in addition to the elements in FIG. 7 (namely, a CMOS (Complementary MOS) configuration).

By having the latch circuit of a CMOS configuration, it is possible to control cutting off the power line of a memory cell circuit not having data written in accordance with a latched state of data, to prevent an unnecessary leakage current from flowing, and to avoid stress on the data-unwritten memory cell.

The memory circuit 71 is a circuit that includes a first CMOS inverter configured to have a first PMOS transistor Q1 and a first NMOS transistor Q3, and a second CMOS inverter configured to have a second PMOS transistor Q2 and a second NMOS transistor Q4. The memory circuit 71 has the first CMOS inverter and the second CMOS inverter to form the latch circuit.

The first NMOS transistor Q3 is an example of a first MOS transistor of a first conductive type, the first PMOS transistor Q1 is an example of a first MOS transistor of a second conductive type, the second NMOS transistor Q4 is an example of a second MOS transistor of the first conductive type, and the second PMOS transistor Q2 is an example of a second MOS transistor of the second conductive type.

The first PMOS transistor Q1 is inserted and connected in series between the first NMOS transistor Q3 and a memory cell 65 among a pair of memory cells 64-65. On the other hand, the second PMOS transistor Q2 is inserted and connected in series between the second NMOS transistor Q4 and the memory cell 65 among the pair of memory cells 64-65.

When data is read out of the pair of memory cells 64-65, both the gate control signal and the activation signal CROSS_SW are in on states. In the states, an operation of the memory unit 60 in FIG. 8 will be described when the memory power supply rises, with reference to FIG. 9 and FIG. 10.

Figure 9:
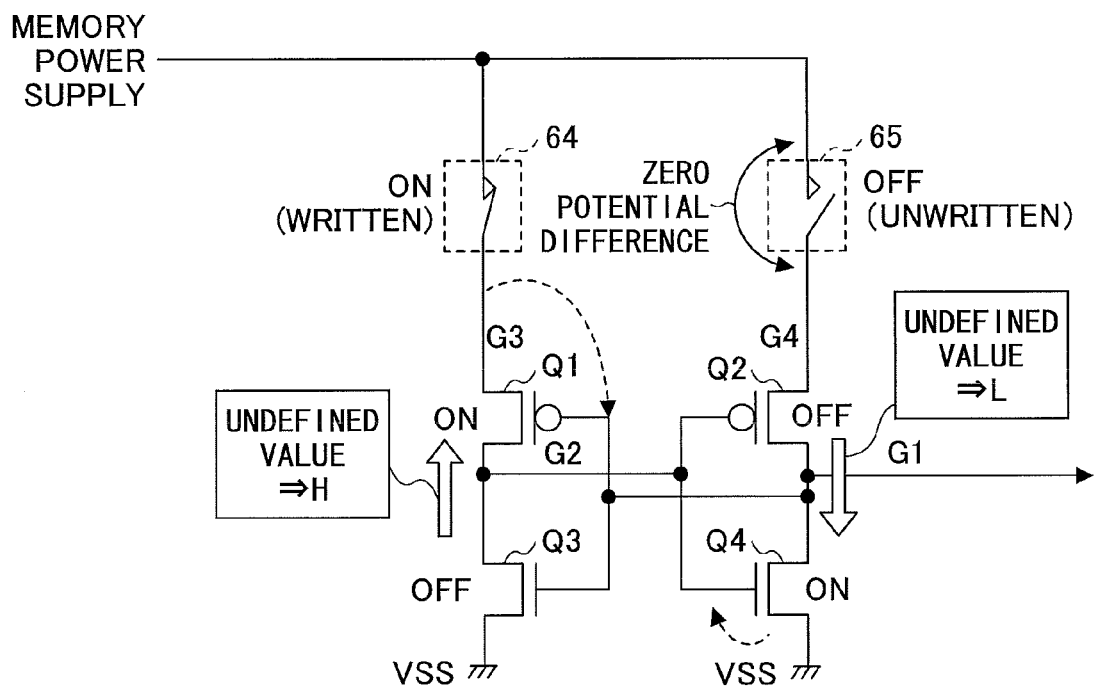
FIG. 9 is a diagram that illustrates an example of a circuit that models a memory unit configured as in FIG. 8.
Figure 10:
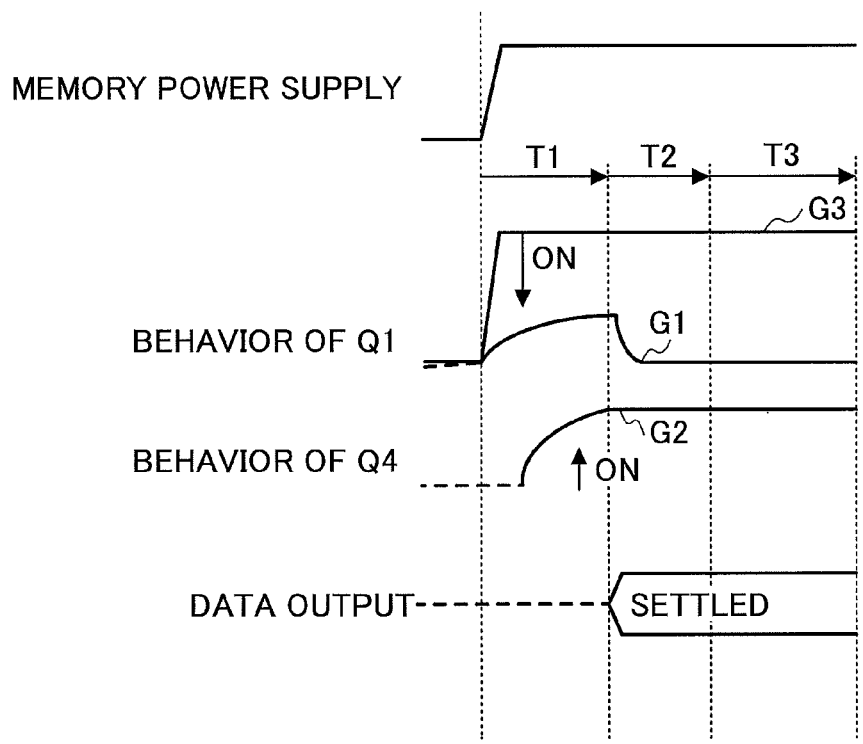
FIG. 10 is a diagram that illustrates an example of operations of a memory unit configured as in FIG. 8.

FIG. 9 is a diagram that illustrates an example of a circuit that models the memory unit 60 configured as in FIG. 8. FIG. 10 is a diagram that illustrates an example of operations of the memory unit 60 configured as in FIG. 8. An example of a circuit operation will be described in which the first memory cell 64 is in an on state (data written state), and the second memory cell 65 is in an off state (data unwritten state).

During a period T1, since the second memory cell 65 is off, the potential at nodes G4 and G1 takes an undefined value (virtually zero). Therefore, the voltage between the gate and source (G3-G1) of the first PMOS transistor Q1 is greater than or equal to the threshold of the first PMOS transistor Q1|Vthp (Q1)|, and hence, the first PMOS transistor Q1 turns on.

On the other hand, during the period T1, since the second memory cell 65 is off, the node G4 (the source potential of the second PMOS transistor Q2) takes an undefined value (virtually zero). Therefore, the voltage between the gate and source (G4-G2) of the second PMOS transistor Q2 is less than the threshold of the second PMOS transistor Q2|Vthp (Q2)|, and hence, the second PMOS transistor Q2 remains off.

Turning on the first PMOS transistor Q1 changes the potential of the node G2 to the high level which is the same as the memory power supply (period T2). When the potential of the node G2 rises, the second NMOS transistor Q4 turns on, and the potential of the node G1 changes to the low level (ground level) (period T2). The circuit is continuously stable in this state (period T3).

In this way, according to this configuration, data output can be settled at virtually the same time as the memory power supply rises without a control clock for read and the like.

Figure 11:
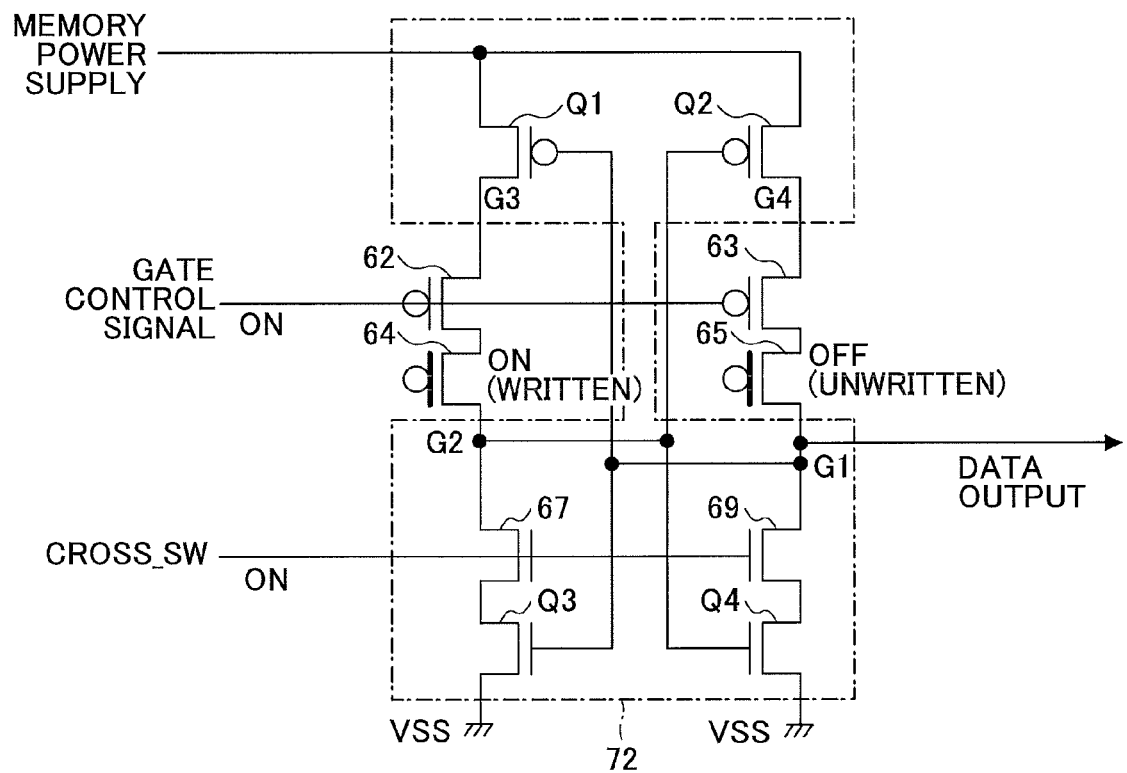
FIG. 11 is a diagram that illustrates a third example of a configuration of a memory unit.

FIG. 11 is a diagram that illustrates a third example of a configuration of the memory unit 60. For the same elements as in the first example and the second example, description in the first example and the second example above will be referred to. A memory circuit 72 in FIG. 11 is a circuit in which positions of the pair of memory cells 64-65 and the pair of selector transistors 62-63 are changed from those in the configuration in FIG. 8.

The first PMOS transistor Q1 is inserted and connected in series between the memory power supply and the memory cell 64 among the pair of memory cells 64-65. On the other hand, the second PMOS transistor Q2 is inserted and connected in series between the memory power supply and the memory cell 65 among the pair of memory cells 64-65.

When data is read out of the pair of memory cells 64-65, both the gate control signal and the activation signal CROSS_SW are in on states. In the states, an operation of the memory unit 60 in FIG. 11 will be described when the memory power supply rises, with reference to FIG. 12 and FIG. 13.

Figure 12:
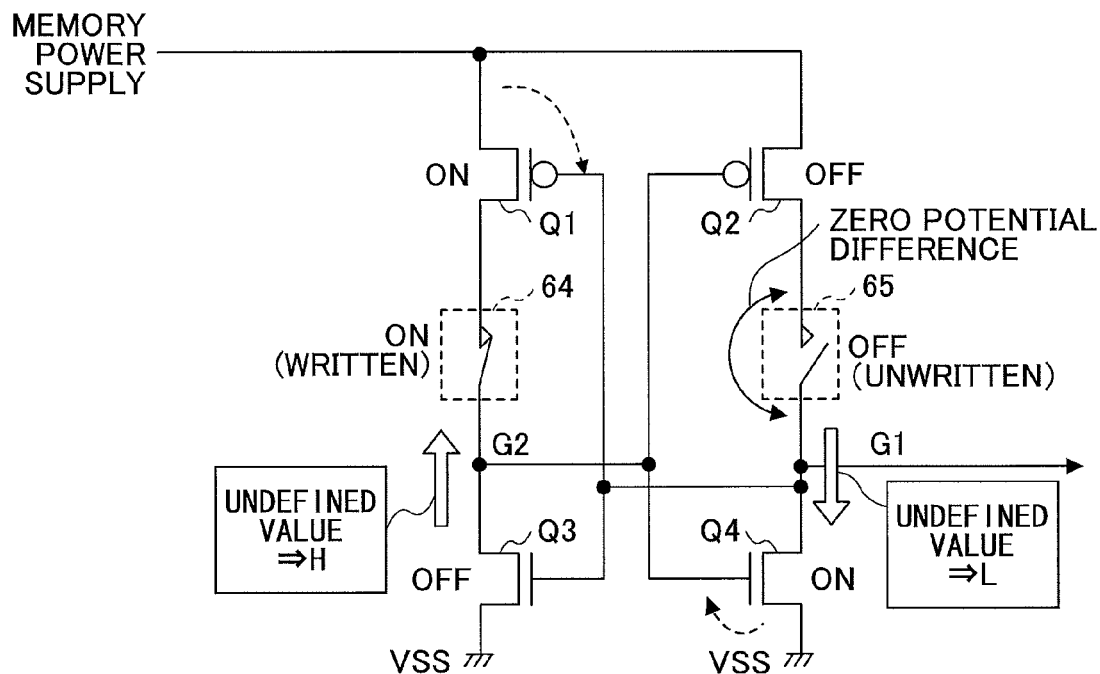
FIG. 12 is a diagram that illustrates an example of a circuit that models a memory unit configured as in FIG. 11.
Figure 13:
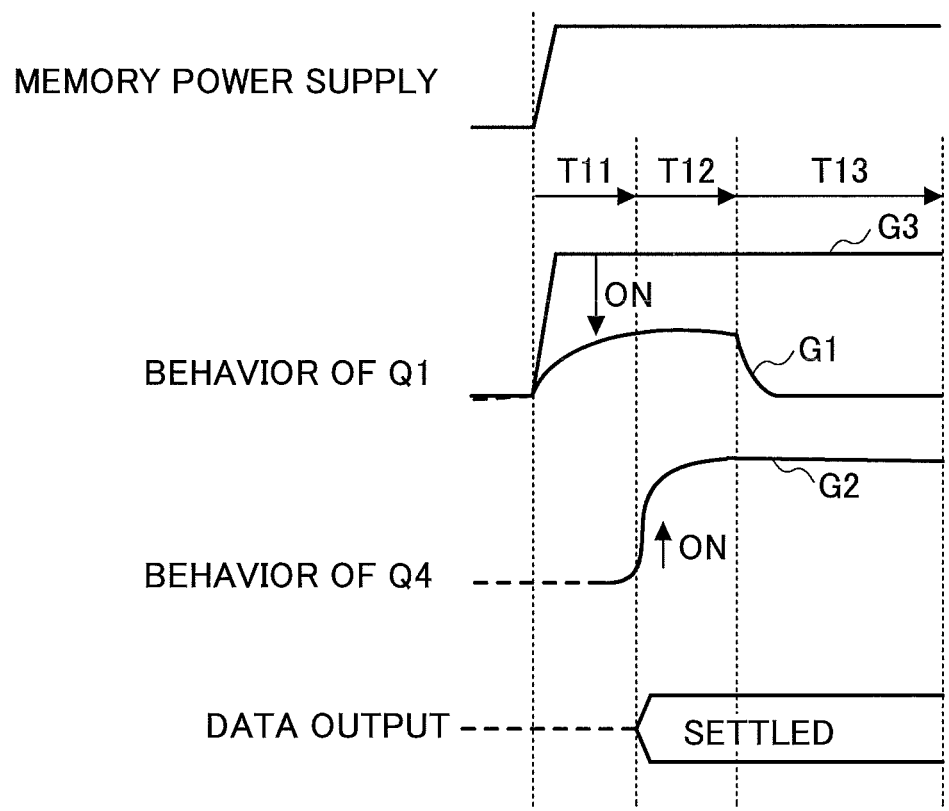
FIG. 13 is a diagram that illustrates an example of operations of a memory unit configured as in FIG. 11.

FIG. 12 is a diagram that illustrates an example of a circuit that models the memory unit 60 configured as in FIG. 11. FIG. 13 is a diagram that illustrates an example of operations of the memory unit 60 configured as in FIG. 11. An example of a circuit operation will be described in which the first memory cell 64 is in an on state (data written state), and the second memory cell 65 is in an off state (data unwritten state).

During a period T11, since the second memory cell 65 is off, the high level that is the same as the memory power supply is not output, and hence, the initial state of the node G1 (the gate potential of the first PMOS transistor Q1) holds a low level. Therefore, the voltage between the gate and source of the first PMOS transistor Q1 is greater than or equal to the threshold of the first PMOS transistor Q1|Vthp (Q1)|, and hence, the first PMOS transistor Q1 turns on.

Turning on the first PMOS transistor Q1 changes the potential of the node G2 to the high level which is the same as the memory power supply (period T12). When the potential of the node G2 rises, the second NMOS transistor Q4 turns on, and the potential of the node G1 changes to the low level (ground level) (period T12). The circuit is continuously stable in this state (period T13).

In this way, according to this configuration, data output can be settled at virtually the same time as the memory power supply rises without a control clock for read and the like.

Figure 14:
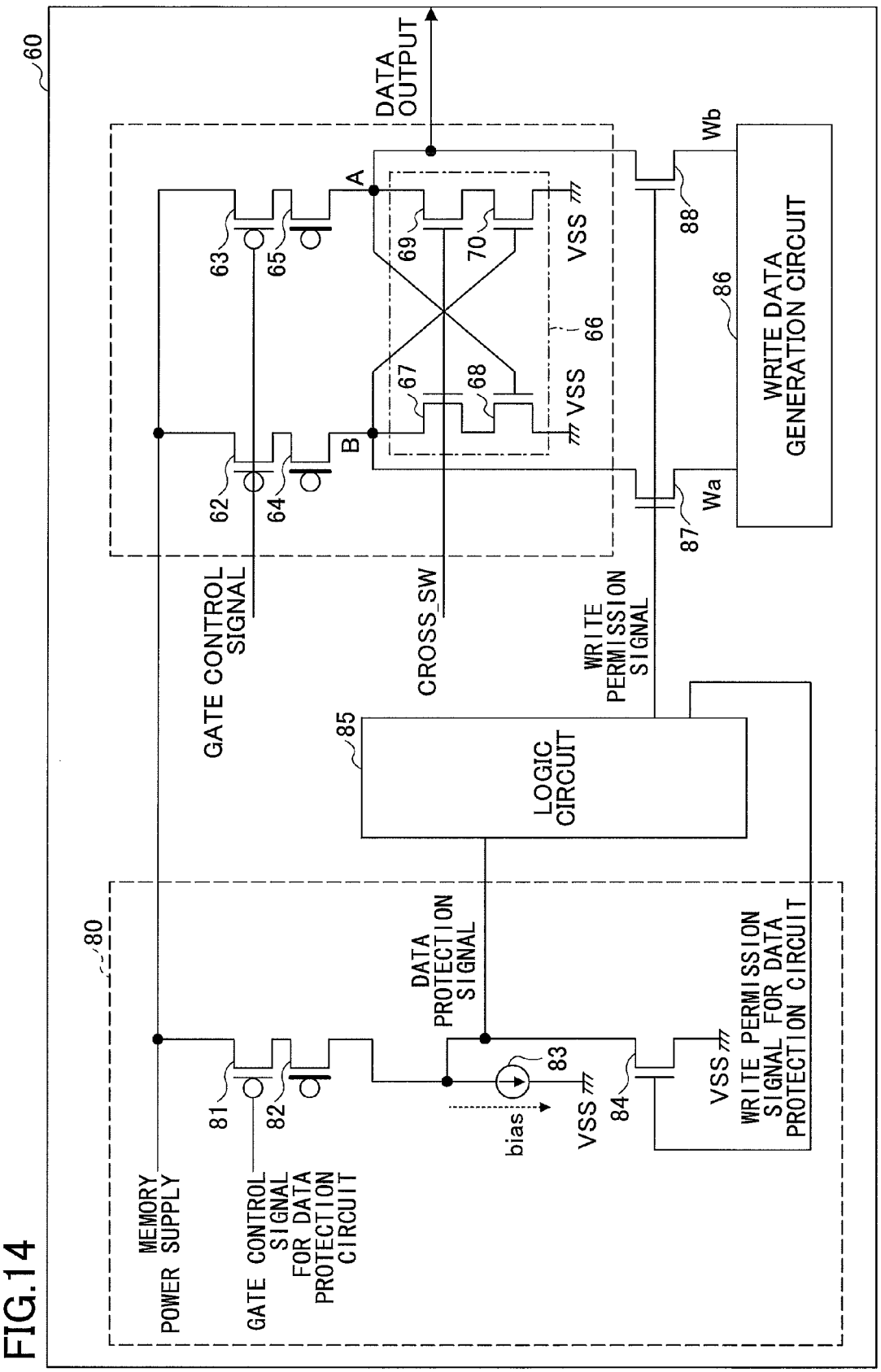
FIG. 14 is a diagram that illustrates an example of a configuration of a write protection circuit to inhibit a write into a pair of memory cells.
Figure 15:
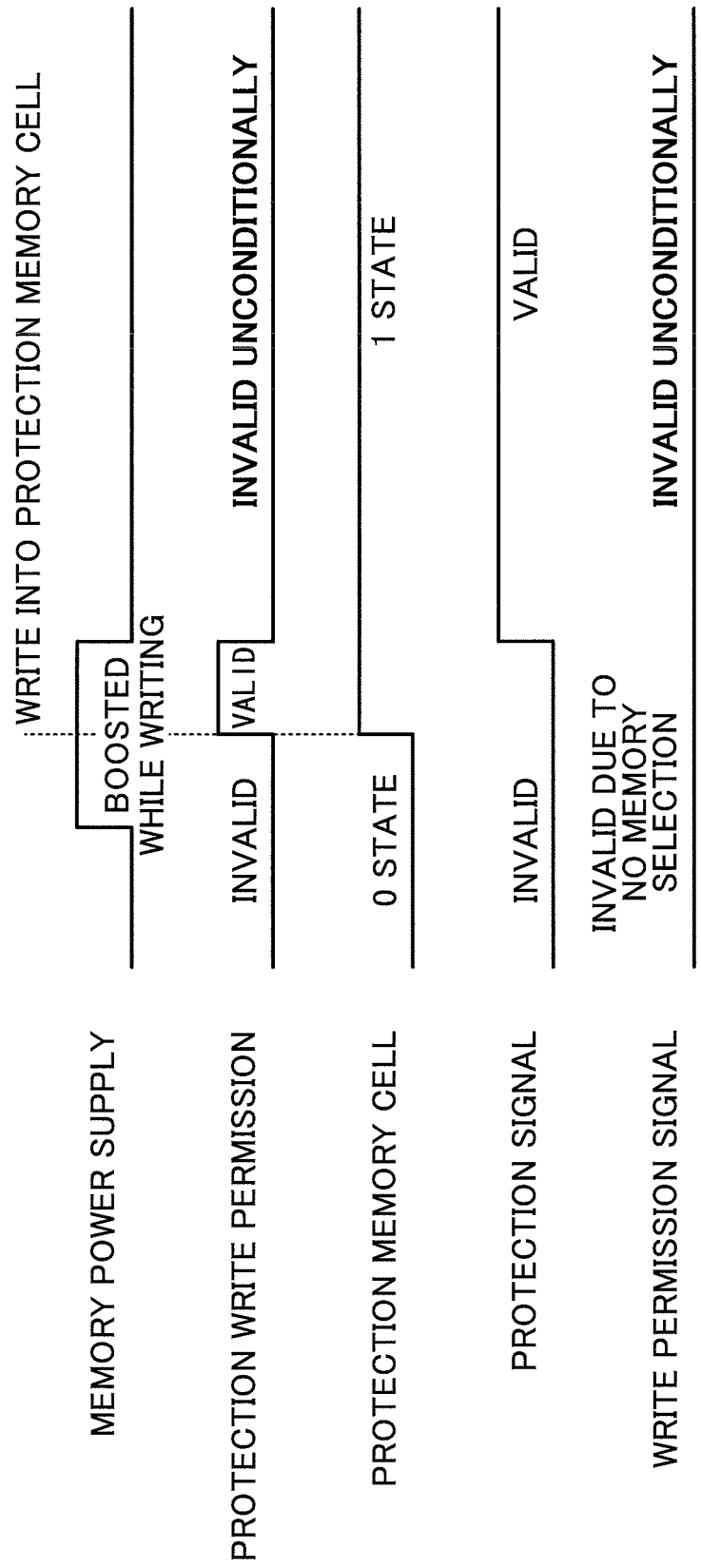
FIG. 15 is a diagram that illustrates an example of write protection operations.

FIG. 14 is a diagram that illustrates an example of a data protection circuit 80 to protect data written into the pair of memory cells 64-65. The memory unit 60 may include a write data generation circuit 86, the data protection circuit 80, and a logic circuit 85. The data protection circuit 80 is an example of a write protection circuit that inhibits a data write into the pair of memory cells 64-65 after the write data generation circuit 86 has written data into the pair of memory cells 64-65. Next, with reference to FIG. 14 and FIG. 15, an example of operations to inhibit a data write will be described.

During a data write period of the pair of memory cells 64-65, the write data generation circuit 86 outputs write data Wa and Wb, the logic circuit 85 enables a write permission signal that permits a data write into the pair of memory cells 64-65. Enabling the write permission signal turns on a pair of switches 87-88. Thus, the write data Wa is written into the first memory cell 64, and the write data Wb is written into the first memory cell 65.

The write data is controlled by the write data generation circuit 86 to be written. When executing a write into the memory to set data output to the high level, the write data generation circuit 86 sets the data Wa to the high level, and the data Wb to the low level. This turns on the memory cell 65. On the other hand, when executing a write into the memory to set data output to the low level, the write data generation circuit 86 sets the data Wa to the low level, and the data Wb to the high level. This turns on the memory cell 64. Therefore, the levels of the data written into the pair of memory cells 64-65 are always inverted to each other. In this state, the data protection circuit 80 is in a non-active state, the write permission signal is in an active state, and the memory cell is in a write-permissible state.

Next, after the write data generation circuit 86 has completed the write into the memory cell, the gate control signal for the data protection circuit is enabled to turn on the transistor 81. Further, the logic circuit 85 enables a write permission signal for the data protection circuit, to turn on the transistor 84. Thus, the memory 82 of a protection bit becomes write-permissible.

When the memory 82 of the protection bit is written, the data protection signal is set to output the level of the memory power supply, to enable a protection operation, and the logic circuit 85 fixes the pair of switches 87-88 to off, to disable write permission signals for all data memories. Therefore, an overwrite or an erroneous write on a data memory can be prevented, which effectively protects the data memory information.

A write into a memory cell is executed by applying a high voltage to the source of the PMOS transistor, and pulling out the charge to the ground. Therefore, if a path from the memory cell to the ground, for example, the path including the pair of switches 87 and 88 is cut off, data cannot be written into the memory cell. Therefore, an erroneous write of data into the pair of memory cells 64-65 can be prevented.

Although the battery protection IC has been described with the embodiments as above, the present invention is not limited to the above embodiments. Various modifications and improvements can be made within the scope of the present invention by combining and/or replacing a part of or all of the embodiments with the others.

For example, a selector transistor to select a memory cell from which data is statically output may be positioned between the memory cell and the ground. For example, in FIG. 5, the first selector transistor 62 may be connected in series between the first memory cell 64 and the output node B, and the second selector transistor 63 may be connected in series between the second memory cell 65 and the output node A.

What is claimed is:
1. A battery protection IC, including
an overcharge detection circuit configured to detect an overcharge of a secondary battery,
an over-discharge detection circuit configured to detect an over-discharge of the secondary battery, an overcurrent detection circuit configured to detect an overcurrent of the secondary battery,
a control circuit configured to protect the secondary battery, by controlling charging and discharging the secondary battery when at least one fault is detected among the overcharge, the over-discharge and the overcurrent, and
a delay circuit configured to generate a delay time to be passed before controlling charging and discharging the secondary battery after the fault has been detected, comprising:
a memory unit configured to store both data of characteristic setting data for setting a circuit characteristic of the battery protection IC, and characteristic adjustment data for adjusting an individual difference of the circuit characteristic of the battery protection IC; and
a setting circuit configured to automatically set the circuit characteristic, and to adjust the individual difference, based on both of said data output from the memory unit,
wherein the memory unit includes
a set of a pair of non-volatile memory cells to complementarily store one bit, and a latch circuit having direct cross-coupled connections with outputs of the pair of memory cells, provided for each bit of both of said data,
wherein the latch circuit automatically statically outputs the data stored in the memory cells provided for both of said data to the setting circuit when a power source of the battery protection IC rises.

2. A battery protection IC, including
an overcharge detection circuit configured to detect an overcharge of a secondary battery,
an over-discharge detection circuit configured to detect an over-discharge of the secondary battery,
an overcurrent detection circuit configured to detect an overcurrent of the secondary battery,
a control circuit configured to protect the secondary battery, by controlling charging and discharging the secondary battery when at least one fault is detected among the overcharge, the over-discharge and the overcurrent, and
a delay circuit configured to generate a delay time to be passed before controlling charging and discharging the secondary battery after the fault has been detected, comprising:
a memory unit configured to store at least one of data among characteristic setting data for setting a circuit characteristic of the battery protection IC, and characteristic adjustment data for adjusting an individual difference of the circuit characteristic of the battery protection IC; and
a setting circuit configured to automatically set the circuit characteristic, and to adjust the individual difference, based on said one of data output from the memory unit,
wherein the memory unit includes
a set of a pair of non-volatile memory cells to complementarily store one bit, and a latch circuit having direct cross-coupled connections with outputs of the pair of memory cells, provided for each bit of said one of data,
wherein the latch circuit automatically statically outputs the data stored in the memory cells provided for said one of data to the setting circuit when a power source of the battery protection IC rises.

3. The battery protection IC as claimed in claim 1, wherein the circuit characteristic includes at least one characteristic among a threshold voltage for detection of the overcharge, a threshold voltage for detection of the over-discharge, a threshold voltage for detection of the overcurrent, and the delay time.

4. The battery protection IC as claimed in claim 1, further comprising:
a selector transistor configured to be disposed between the memory cell, and a memory power supply or a ground, to select the memory cell from which data is statically output.

5. The battery protection IC as claimed in claim 1, wherein the latch circuit includes a first MOS transistor of a first conductive type, and a second MOS transistor of the first conductive type, cross-coupled and connected with each other.

6. The battery protection IC as claimed in claim 5, wherein the latch circuit includes
a first MOS transistor of a second conductivity type inserted between the first MOS transistor of the first conductive type and one of the pair of memory cells, and having a control terminal connected with a control terminal of the first MOS transistor of the first conductive type, and
a second MOS transistor of the second conductivity type inserted between the second MOS transistor of the first conductive type and another of the pair of memory cells, and having a control terminal connected with a control terminal of the second MOS transistor of the first conductive type.

7. The battery protection IC as claimed in claim 5, wherein the latch circuit includes
a first MOS transistor of a second conductivity type inserted between a memory power supply and one of the pair of memory cells, and having a control terminal connected with a control terminal of the first MOS transistor of the first conductive type, and
a second MOS transistor of the second conductivity type inserted between the memory power supply and another of the pair of memory cells, and having a control terminal connected with a control terminal of the second MOS transistor of the first conductive type.

8. The battery protection IC as claimed in claim 1, further comprising:
a write protection circuit configured to inhibit a write into the pair of memory cells.

9. A circuit characteristic setting method executed in a battery protection IC configured to protect a secondary battery, by controlling charging and discharging the secondary battery, after a delay time has passed since at least one fault has been detected among an overcharge of a secondary battery, an over-discharge of the secondary battery, and an overcurrent of the secondary battery,
the method comprising:
having a memory unit output at least one of data among characteristic setting data for setting a circuit characteristic of the battery protection IC, and characteristic adjustment data for adjusting an individual difference of the circuit characteristic of the battery protection IC, to have a setting circuit automatically set the circuit characteristic, or adjust the individual difference,
wherein the memory unit includes a set of a pair of non-volatile memory cells to complementarily store one bit, and a latch circuit having direct cross-coupled connections with outputs of the pair of memory cells, provided for each bit of said one of data, and automatically statically outputting the data stored in the memory cells provided for said one of data to the setting circuit when a power source of the battery protection IC rises.

10. A battery protection IC, including an overcharge detection circuit configured to detect an overcharge of a secondary battery, an over-discharge detection circuit configured to detect an over-discharge of the secondary battery, an overcurrent detection circuit configured to detect an overcurrent of the secondary battery, a control circuit configured to protect the secondary battery, by controlling charging and discharging the secondary battery when at least one fault is detected among the overcharge, the over-discharge and the overcurrent, and a delay circuit configured to generate a delay time to be passed before controlling charging and discharging the secondary battery after the fault has been detected, comprising:

a memory unit configured to store at least one of data among characteristic setting data for setting a circuit characteristic of the battery protection IC, and characteristic adjustment data for adjusting an individual difference of the circuit characteristic of the battery protection IC; and a setting circuit configured to automatically set the circuit characteristic, and to adjust the individual difference, based on said one of data output from the memory unit, wherein the memory unit includes a set of a pair of non-volatile memory cells to complementarily store one bit, and a latch circuit having cross-coupled connections with outputs of the pair of memory cells, provided for each bit of said one of data, wherein the latch circuit automatically statically outputs the data stored in the memory cells provided for said one of data to the setting circuit when a power source of the battery protection IC rises, wherein the latch circuit includes a first MOS transistor of a first conductive type, and a second MOS transistor of the first conductive type, cross-coupled and connected with each other, wherein the latch circuit further includes a first MOS transistor of a second conductivity type inserted between the first MOS transistor of the first conductive type and one of the pair of memory cells, and having a control terminal connected with a control terminal of the first MOS transistor of the first conductive type, and a second MOS transistor of the second conductivity type inserted between the second MOS transistor of the first conductive type and another of the pair of memory cells, and having a control terminal connected with a control terminal of the second MOS transistor of the first conductive type.

11. A battery protection IC, including an overcharge detection circuit configured to detect an overcharge of a secondary battery, an over-discharge detection circuit configured to detect an over-discharge of the secondary battery, an overcurrent detection circuit configured to detect an overcurrent of the secondary battery, a control circuit configured to protect the secondary battery, by controlling charging and discharging the secondary battery when at least one fault is detected among the overcharge, the over-discharge and the overcurrent, and a delay circuit configured to generate a delay time to be passed before controlling charging and discharging the secondary battery after the fault has been detected, comprising:

a memory unit configured to store at least one of data among characteristic setting data for setting a circuit characteristic of the battery protection IC, and characteristic adjustment data for adjusting an individual difference of the circuit characteristic of the battery protection IC; and a setting circuit configured to automatically set the circuit characteristic, and to adjust the individual difference, based on said one of data output from the memory unit, wherein the memory unit includes a set of a pair of non-volatile memory cells to complementarily store one bit, and a latch circuit having cross-coupled connections with outputs of the pair of memory cells, provided for each bit of said one of data, wherein the latch circuit automatically statically outputs the data stored in the memory cells provided for said one of data to the setting circuit when a power source of the battery protection IC rises, wherein the latch circuit includes a first MOS transistor of a first conductive type, and a second MOS transistor of the first conductive type, cross-coupled and connected with each other, wherein the latch circuit further includes a first MOS transistor of a second conductivity type inserted between a memory power supply and one of the pair of memory cells, and having a control terminal connected with a control terminal of the first MOS transistor of the first conductive type, and a second MOS transistor of the second conductivity type inserted between the memory power supply and another of the pair of memory cells, and having a control terminal connected with a control terminal of the second MOS transistor of the first conductive type.

* * * * *